(12) United States Patent
Takano

(10) Patent No.: US 7,333,307 B2
(45) Date of Patent: Feb. 19, 2008

(54) DOUBLE LAYER LONGITUDINAL BIAS STRUCTURE

(75) Inventor: Kenichi Takano, Cupertino, CA (US)

(73) Assignee: Headway Technologies, Inc., Milpitas, CA (US)

(*) Notice: Subject to any disclaimer, the term of this patent is extended or adjusted under 35 U.S.C. 154(b) by 0 days.

(21) Appl. No.: 10/613,598

(22) Filed: Jul. 3, 2003

(65) Prior Publication Data

US 2005/0002130 A1    Jan. 6, 2005

(51) Int. Cl.
*G11B 5/33* (2006.01)
(52) U.S. Cl. .................................. 360/327.3
(58) Field of Classification Search .......... 360/324.12, 360/324.1, 324.11, 327.31, 327.22, 327.23, 360/324, 327.3, 327.32
See application file for complete search history.

(56) References Cited

U.S. PATENT DOCUMENTS

| | | | |
|---|---|---|---|
| 6,313,973 B1 | 11/2001 | Fuke et al. | 360/324.1 |
| 6,338,899 B1 | 1/2002 | Fukuzawa et al. | 428/332 |
| 6,362,941 B1 | 3/2002 | Gill | 360/324.11 |
| 6,385,017 B1* | 5/2002 | Min et al. | 360/324.12 |
| 6,396,669 B1 | 5/2002 | Gill | 360/319 |
| 6,517,896 B1 | 2/2003 | Horng et al. | 427/123 |
| 6,542,341 B1 | 4/2003 | Carey et al. | 360/324 |
| 6,633,466 B2* | 10/2003 | Sakaguci et al. | 360/327.31 |
| 6,731,478 B2* | 5/2004 | Nakamoto et al. | 360/324.1 |
| 6,822,836 B2* | 11/2004 | Gill | 360/324.12 |
| 2003/0123200 A1* | 7/2003 | Nagasaka et al. | 360/324.1 |
| 2003/0189802 A1* | 10/2003 | Morinaga et al. | 360/324.12 |
| 2003/0202295 A1* | 10/2003 | Wang et al. | 360/324.12 |
| 2004/0047087 A1* | 3/2004 | Fukui et al. | 360/324.12 |
| 2004/0141261 A1* | 7/2004 | Hasegawa et al. | 360/324.11 |
| 2004/0223269 A1* | 11/2004 | Wang et al. | 360/324.12 |
| 2004/0252419 A1 | 12/2004 | Takano | 360/324.12 |

* cited by examiner

*Primary Examiner*—Tianjie Chen
(74) *Attorney, Agent, or Firm*—Saile Ackerman LLC; Stephen B. Ackerman

(57) ABSTRACT

It is necessary to stabilize the free layer of GMR or TMR devices by providing a longitudinal bias field. As read tracks become very narrow, this field can drastically reduce the strength of the output signal. This problem has been overcome by adding an additional bias layer. This layer, which may be located either above or below the conventional bias layer, is permanently magnetized in the opposite direction to that of the permanent magnets used to achieve longitudinal stability. Through control of the magnetization strength and location of this additional bias layer, cancellation of much of the field induced in the free layer by the conventional bias layers is achieved.

32 Claims, 4 Drawing Sheets

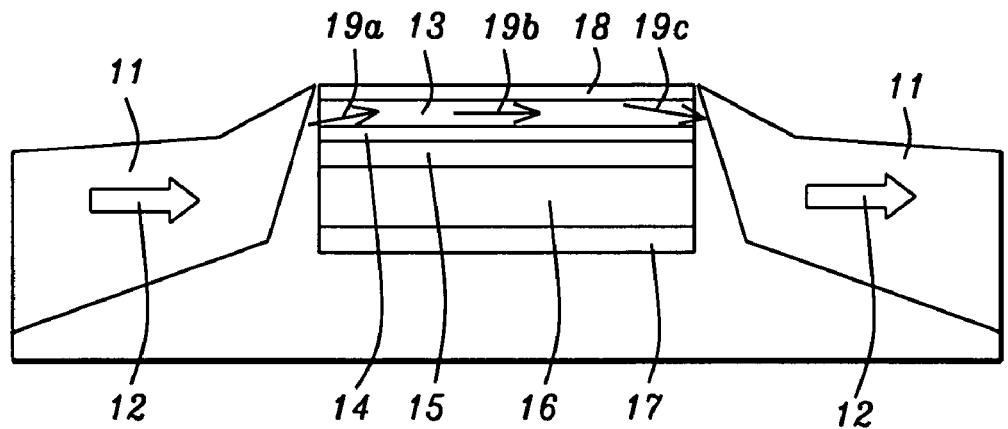
FIG. 1 — Prior Art
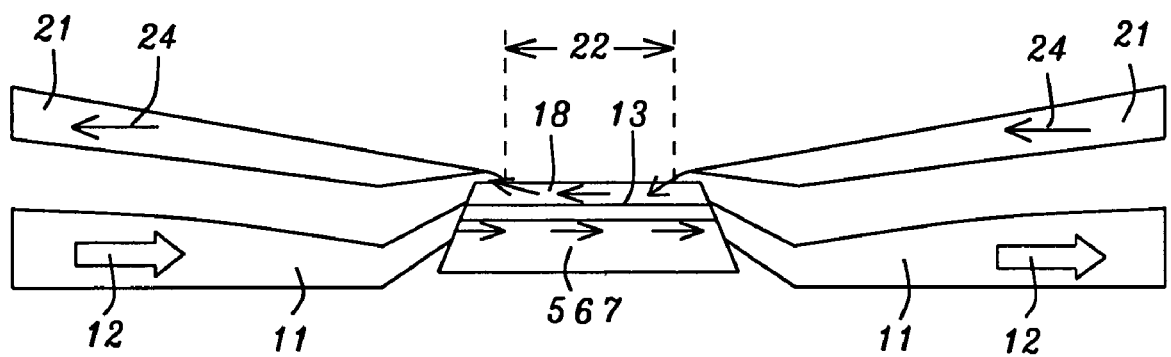
FIG. 2a

DOUBLE LAYER LONGITUDINAL BIAS STRUCTURE

FIELD OF THE INVENTION

The invention relates to the general field of magnetic disk storage with particular reference to read heads and specifically to longitudinal bias stabilization thereof.

BACKGROUND OF THE INVENTION

The principle governing the operation of most current magnetic read heads is the change of resistivity of certain materials in the presence of a magnetic field (magneto-resistance or MR). Magneto-resistance can be significantly increased by means of a structure known as a spin valve or SV. The resulting increase (known as Giant Magneto-Resistance or GMR) derives from the fact that electrons in a magnetized solid are subject to significantly less scattering by the lattice when their own magnetization vectors (due to spin) are parallel (as opposed to anti-parallel) to the direction of magnetization of their environment.

The key elements of a spin valve are a low coercivity (free) ferromagnetic layer, a non-magnetic spacer layer, and a high coercivity ferromagnetic layer. The latter is usually formed out of a soft ferromagnetic layer that is pinned magnetically by a nearby layer of antiferromagnetic material. Alternatively, a synthetic antiferromagnet (formed by sandwiching an antiferromagnetic coupling layer between two antiparallel ferromagnetic layers) may be used to replace the ferromagnetic pinned layer.

When the free layer is exposed to an external magnetic field, the direction of its magnetization is free to rotate according to the direction of the external field. After the external field is removed, the magnetization of the free layer will stay at a direction, dictated by the minimum energy state, which is determined by the crystalline and shape anisotropy, current field, coupling field and demagnetization field. If the direction of the pinned field is parallel to the free layer, electrons passing between the free and pinned layers, suffer less scattering. Thus, the resistance in this state is lower. If, however, the magnetization of the pinned layer is anti-parallel to that of the free layer, electrons moving from one layer into the other will suffer more scattering so the resistance of the structure will increase. The change in resistance of a spin valve is typically 8-20%.

First generation GMR devices were designed so as to measure the resistance of the free layer for current flowing in the plane (CIP) of the film. However, as the quest for ever greater densities continues, devices that measure current flowing perpendicular to the plane (CPP) have begun to emerge. For devices depending on in-plane current, the signal strength is diluted by parallel currents flowing through the other layers of the GMR stack, so these layers should have resistivities as high as possible while the resistance of the leads into and out of the device need not be particularly low. By contrast, in a CPP device, the resistivity of both the leads and the other GMR stack layers dominate and should be as low as possible.

A device that is particularly well suited to the CPP design is the magnetic tunneling junction (MTJ) in which the layer that separates the free and pinned layers is a non-magnetic insulator, such as alumina or silica. Its thickness needs to be such that it will transmit a significant tunneling current. The principle governing the operation of the MTJ is the change of resistivity of the tunnel junction between two ferromagnetic layers. When the magnetization of the two ferromagnetic layers is in opposite directions, the tunneling resistance increases due to a reduction in the tunneling probability. The change of resistance is typically about 40%. The device is also referred to as a TMR (tunnel magneto-resistance) device Although the layers enumerated above are all that is needed to produce the GMR or TMR effects, additional problems remain. In particular, there are certain noise effects associated with these structures. Magnetization in a layer can be irregular because of reversible breaking of magnetic domain walls, leading to the phenomenon of Barkhausen noise. The solution to this problem has been to provide a device structure conducive to ensuring that the free layer is a single domain so that the domain configuration remains unperturbed after fabrication and under normal operation.

A typical prior art arrangement for longitudinal biasing is illustrated in schematic cross-section in FIG. 1. Seen there are seed layer 17, pinning layer 16, pinned layer 15, free layer 13, non-magnetic layer 14, and capping layer 18. If layer 14 is conductive, the device is a GMR unit while if it is a dielectric, the device is a TMR unit. Two opposing permanent magnets (PM) 11, magnetized in the direction shown by arrows 12, are located at the sides of the device.

As track widths grow very small (<0.2 microns), the above biasing configuration has been found to no longer be suitable since the strong magnetostatic coupling at the track edges also pins the magnetization of the free layer (symbolically illustrated by arrows 19a, 19b, and 19c) which drastically reduces the GMR or TMR sensor sensitivity. Even for read track widths as high as 0.1-0.2 um, the bias field strength is significant at the track center where it interferes with the free-layer magnetization change. Additionally, this reduced sensitivity at the track center leads to a poor track profile shape at the output. This in turn leads to side reading so the magnetic read width (MRW) becomes too wide.

The present invention provides a solution to this problem.

A routine search of the prior art was performed with the following references of interest being found:

U.S. Pat. No. 6,542,341 (Carey et al) describes an additional bias field that balances the total transverse internal magnetic field. U.S. Pat. No. 6,517,896 (Horng et al), discloses two magnetic layers magnetized in opposite directions. U.S. Pat. Nos. 6,396,669 and 6,362,941 (Gill) show two opposite pinned layers. U.S. Pat. Nos. 6,338,899 (Fukuzawa et al) and U.S. Pat. No. 6,313,973 (Fuke et al) teach devices having two opposite magnetic layers.

SUMMARY OF THE INVENTION

It has been an object of at least one embodiment of the present invention to provide a magnetic read head device whose output is both stable as well as unaffected by the steps taken to achieve said stability.

Another object of at least one embodiment of the present invention has been that said device be a CIP GMR device, a CPP GMR device, or a TMR device.

These objects have been achieved by adding to existing designs of GMR and TMR devices an additional bias layer. This layer, which may be located either above or below the conventional bias layer, is permanently magnetized in the opposite direction to that of the permanent magnets used to achieve longitudinal stability. Through control of the magnetization strength and location of this additional bias layer, cancellation of much of the field induced in the free layer by the conventional bias layers is achieved.

BRIEF DESCRIPTION OF THE DRAWINGS

FIG. 1 shows how, as taught by the prior art, longitudinal stabilization is achieved by means of a pair of permanent magnet layers that flank the device in question.

FIG. 2a shows how placing an additional bias layer above the conventional bias layer reduces the magnetization at or near the center of the free layer while leaving the full bias field in place at the edges.

DESCRIPTION OF THE PREFERRED EMBODIMENTS

Figure 2B:
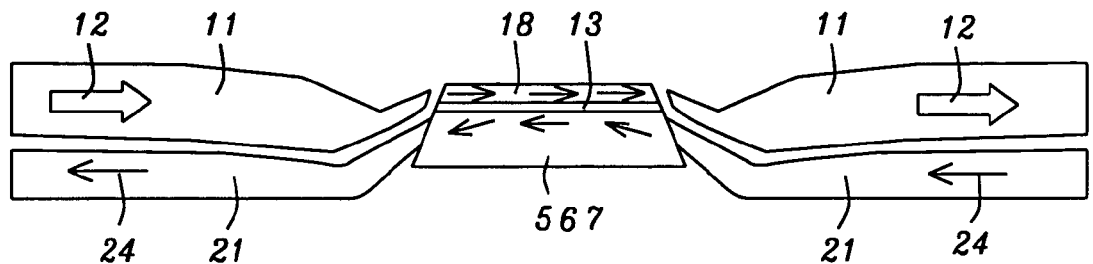
FIG. 2b is similar to FIG. 2a except that the additional bias layer is located below the conventional bias layer.

The basic principle of the present invention is schematically illustrated in FIG. 2a. As can be seen, the GMR or TMR sensor of FIG. 1 has been somewhat simplified by showing layers 14-17 as a single entity 567. The key novel feature seen in FIG. 2a is additional bias layer 21. This has been placed directly above conventional bias layers 11, though separated therefrom by a distance that varies from between about 50 and 300 Angstroms at the edge to between about 30 and 150 Angstroms at the gap.

Additional bias layer 21 has been magnetized in the opposite direction to that of permanent magnet layer 11. It is clear from FIG. 2a that, particularly in the free layer, the magnetization of the additional bias layer largely cancels out that due to the permanent magnet layer. Suitable materials for the additional bias layer include, but are not limited to, CoPt, CoCrPt, CoNiCr, and laminates of NiFe/IrMn, and CoFe/IrMn. These materials have good exchange coupling field with antiferromagnetic layers, giving them an effective coercivity that is between about 0.05 and 0.75 times that of the permanent magnet layer. The additional bias layer needs to have a thickness that is no more than 0.02 microns less than that of the permanent magnet layer (see later).

It is, however, necessary that the free layer continue to be magnetically stabilized at its outer edges so, as can be seen in FIG. 2a, gap 22 (between additional bias layers 21) is equal to, or somewhat smaller than, gap 23 (between conventional bias layers 11). This reduces the magnetization due to the additional bias layer at points directly above the free layer's outer edges, so the magnetization there remains strong. Typically, the gap separating the conventional bias layers is between about 0.1 and 0.2 microns while the gap between the additional bias layers is between about 0.08 and 0.2 microns so that the conventional gap is at most 0.02 microns wider than the newly added additional gap.

It is also possible to locate the additional bias layer below the conventional bias layer. This is shown in FIG. 2b. Other than the location of the additional bias layer, the two structures seen in FIGS. 2a and 2b are equivalent.

Figure 3:
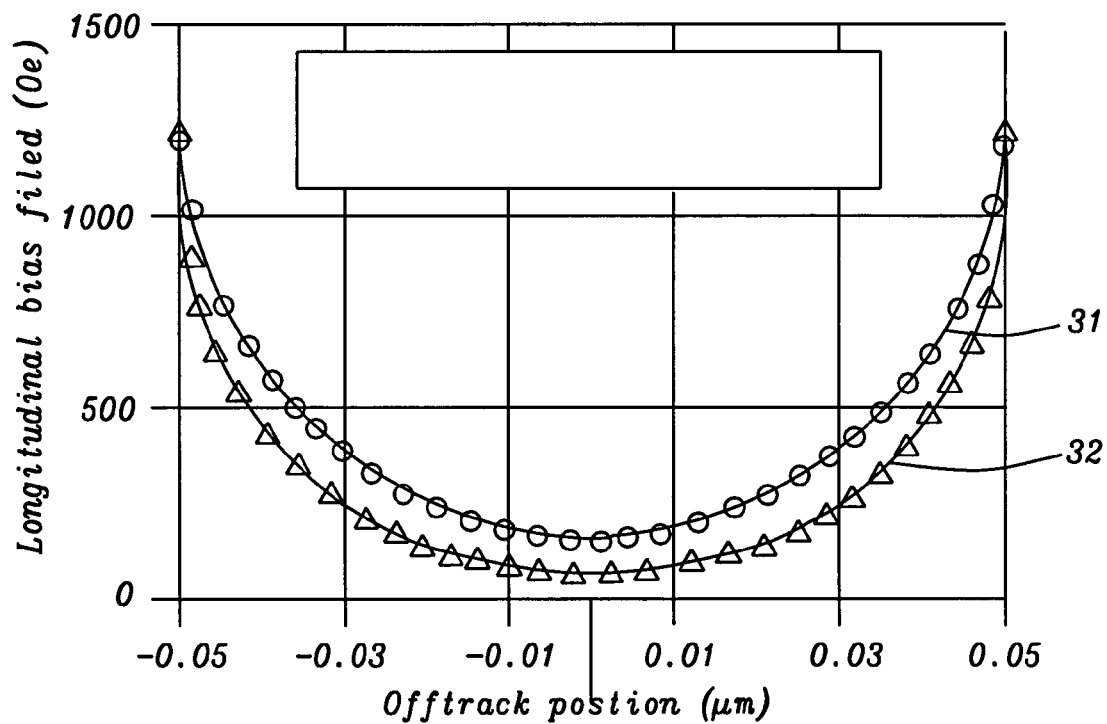
FIG. 3 plots the magnetization of the free layer for a conventional bias layer acting alone and in combination with an additional bias layer.

FIG. 3 shows the longitudinal bias field distribution in the free layer for a 0.1 µm track width. Curve 31 is for the conventional bias field acting alone. The largest field is at the track edge, as required, but the field is still over 150 Oe even at the track center. Curve 32 is for the conventional bias in combination with the additional bias. It is seen that the combination field improves the distribution. At the edges curve 32 has almost same value as curve 31 but it decreases rapidly as we move in from the edge and it levels off with a value of less than 100 Oe in the wide central region. This means that the sensitivity of the free layer to media fields is much improved while its stability level remains essentially unchanged.

Figure 4:
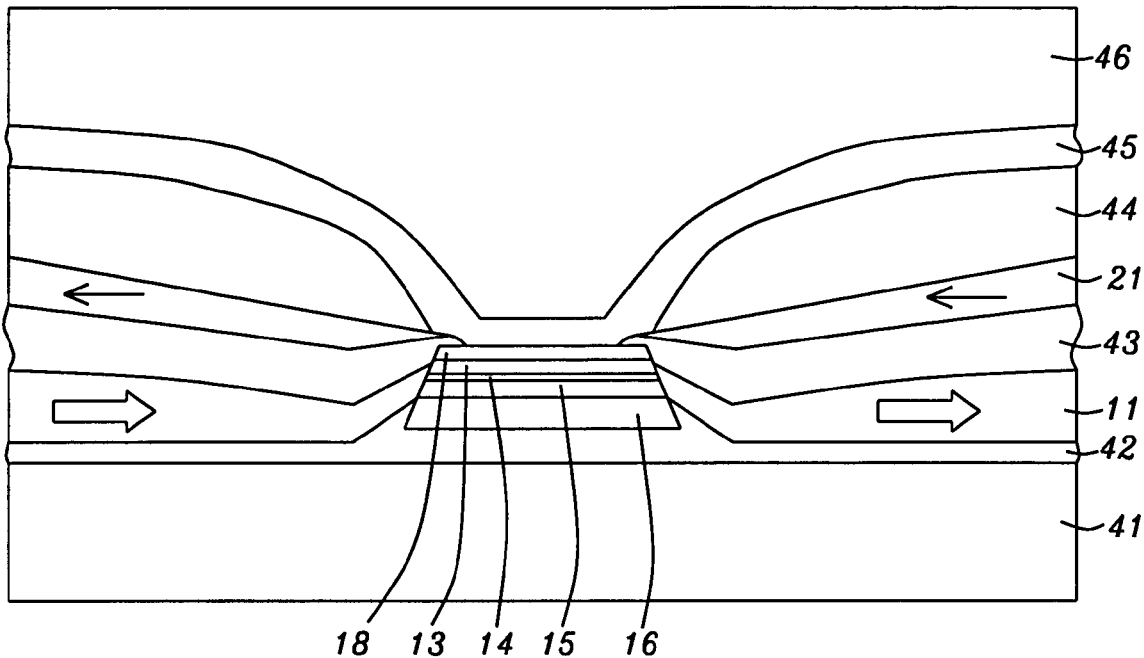
FIGS. 4 and 5 show more detailed implementations of the invention, namely a CIP and a CPP structure, respectively.

FIG. 4 shows the general appearance of a CIP GMR read head, that incorporates the additional bias layer discussed above. GMR stack 15-18 rests on dielectric layer 42 which in turn lies on lower magnetic shield 41.

Conventional permanent magnet layer 11 lies on dielectric layer 42. Conductive spacer layer 43 is on permanent magnet layer 11 with additional bias layer 21 lying on it. As already noted earlier, layers 11 and 21 are magnetized in opposite directions and the gap between layers 21 is made to be equal to or smaller than the gap between layers 11. There is a pair of conductive leads 44 on additional bias layer 21. Dielectric layer 45 covers the entire structure with upper magnetic shield 46 lying over it.

Figure 5:
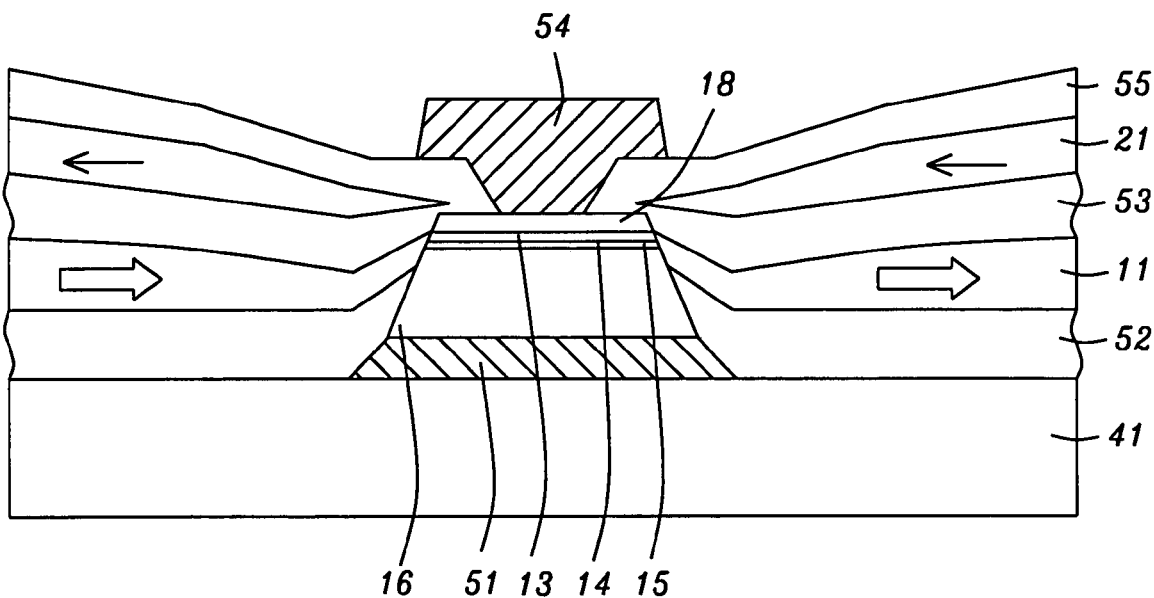

In FIG. 5 we show the general appearance of a CPP read head (GMR or TMR), that incorporates an additional bias layer. Lower conductive lead pedestal 51 lies on lower magnetic shield 41 on which has been formed CPP stack 16-18. Dielectric layer 52 covers lower magnetic shield 41 as well as the sloping side walls of the CPP stack.

Conventional permanent magnet layer 11 lies on dielectric layer 52 and abuts the free layer. Conductive spacer 53 is on permanent magnet layer 11 with additional bias layer 21 lying on it. As before, layers 11 and 21 are magnetized in opposite directions and the gap between layers 21 is made to be equal to or smaller than the gap separating layers 11. Dielectric layer 55 covers additional bias layer 21 as well as part of capping layer 18 and includes an opening so that upper conductive lead layer 54 can make contact to the stack without short circuiting layers 21.

Figure 6:
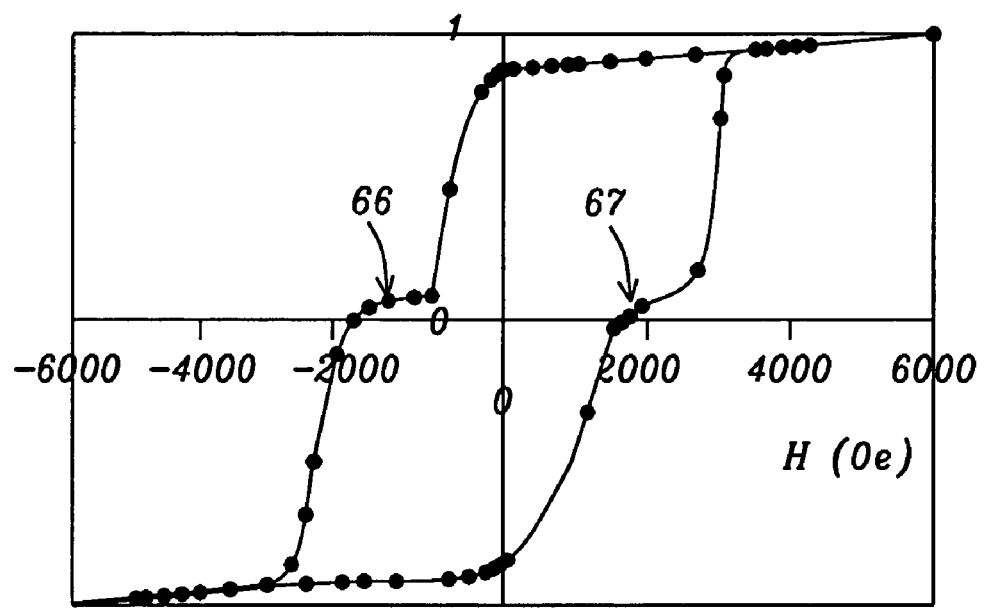
FIGS. 6 and 7 show M-H curves for the invented structure before and after establishment of the anti-parallel state.

In order to optimize the structures described above, the magnetic properties, thickness and position of the conventional and additional bias layers have to be adjusted. FIG. 6 is a M-H curve for a conventional and an additional bias layer film, stacked with a separation, as described earlier. The presence of steps 66 and 67 indicates that each film can switch independently. Here the coercivities of the conventional and additional bias layers were about 1,900 and 700 Oe, respectively, the difference being used to establish the anti-parallel magnetization arrangement.

Figure 7:
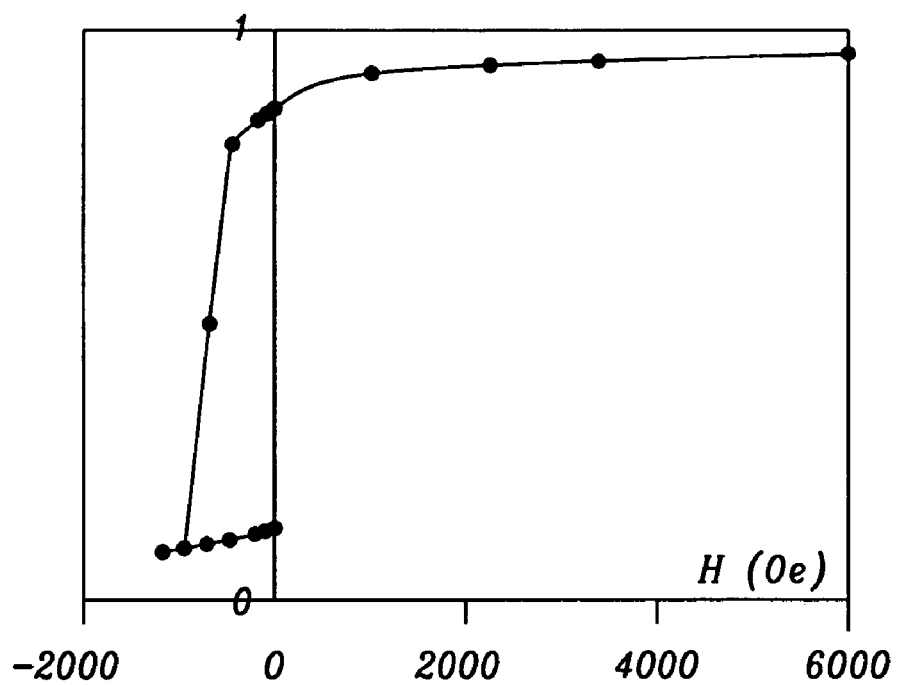

An initial external field larger than 5,000 Oe is applied to set both magnetizations in a longitudinal direction. Then the field is changed, first to about −1,200 Oe and then back to zero. This magnetization process is plotted in FIG. 7. At the −1,200 Oe field only the additional bias layer switches into the opposite direction, resulting in the required anti-parallel state between the bias layers. Also, since the conventional bias layer is thicker than the additional one, the magnetization at zero field does not go to zero.

We conclude by noting that the magnetic properties of thin films are known to be very sensitive to a number of factors in addition to their composition. Said factors include, but may not be limited to, thickness, deposition conditions, annealing treatments (particularly in the presence of a magnetic field), immediate underlayer, and immediate overcoating. Thus, as a general rule, the parameters that characterize the layers named in the claims to be recited below should be regarded as critical rather than merely optimal.

While the invention has been particularly shown and described with reference to the preferred embodiments described above, it will be understood by those skilled in the art that various changes in form and details may be made without departing from the spirit and scope of the invention.

What is claimed is:

1. A magnetic read head having a free layer with enhanced stability and signal strength, comprising:
    a pair of opposing permanent magnet layers, separated by a first gap and magnetized in a first direction, that abut, and do not overlap in any way, including through direct connection to another magnetic material, said free layer, thereby providing longitudinal bias thereto;
    above said permanent magnet layers, a pair of opposing additional bias layers that are separated by a second gap that is less than said first gap; and
    said additional bias layers being magnetized in a second direction that is antiparallel to said first direction, thereby partly canceling said longitudinal bias with no accompanying weakening of the free layer at the free layer edge.

2. The magnetic read head described in claim 1 is a CIP GMR head.

3. The magnetic read head described in claim 1 is a CPP GMR head.

4. The magnetic read head described in claim 1 is a TMR head.

5. The magnetic read head described in claim 1 wherein said additional bias layer is selected from the group consisting of CoPt, CoCrPt, CoNiCr, NiFe/IrMn, and CoFe/IrMn whereby it has good exchange coupling field with antiferromagnetic layers, giving it an effective coercivity that is between about 0.05 and 0.75 times that of said permanent magnet layer.

6. The magnetic read head described in claim 1 wherein said additional bias layer has a thickness that is at most 0.02 microns less than that of said permanent magnet layer.

7. The magnetic read head described in claim 1 wherein said first gap is between about 0.1 and 0.2 microns and said second gap is between about 0.08 and 0.2 microns.

8. The magnetic read head described in claim 1 wherein said distance above said permanent magnet layer of the opposing additional bias layer is between about 50 and 300 Angstroms.

9. A magnetic read head having a free layer with enhanced stability and signal strength, comprising:
    a pair of opposing permanent magnet layers, separated by a first gap and magnetized in a first direction, that abut, and do not overlap in any way, including through direct connection to another magnetic material, said free layer, thereby providing longitudinal bias thereto;
    a distance below said permanent magnet layers, a pair of opposing additional bias layers that are separated by a second gap that is less than said first gap; and
    said additional bias layer being magnetized in a second direction that is antiparallel to said first direction, thereby partly canceling said longitudinal bias with no accompanying weakening of the free layer at the free layer edge.

10. The magnetic read head described in claim 9 is a CIP GMR head.

11. The magnetic read head described in claim 9 is a CPP GMR head.

12. The magnetic read head described in claim 9 is a TMR head.

13. The magnetic read head described in claim 9 wherein said additional bias layer is selected from the group consisting of CoPt, CoCrPt, CoNiCr, NiFe/IrMn, and CoFe/IrMn whereby it has good exchange coupling field with antiferromagnetic layers, giving it an effective coercivity that is between about 0.05 and 0.75 times that of said permanent magnet layer.

14. The magnetic read head described in claim 9 wherein said additional bias layer has a thickness that is at most 0.02 microns less than that of said permanent magnet layer.

15. The magnetic read head described in claim 9 wherein said first gap is between about 0.1 and 0.2 microns and said second gap is between about 0.08 and 0.2 microns.

16. The magnetic read head described in claim 9 wherein said distance below said permanent magnet layer of the opposing additional bias layer is between about 50 and 300 Angstroms.

17. A method to enhance stability of a free layer, while retaining free layer signal strength, in a magnetic read head, comprising:
    providing a pair of opposing permanent magnet layers separated by a first gap and magnetized in a first direction, that abut, and do not overlap in any way, including through direct connection to another magnetic material, said free layer, thereby providing longitudinal bias thereto;
    forming, at a distance above said permanent magnet layers, a pair of opposing additional bias layers that are separated by a second gap that is less than said first gap; and
    then magnetizing said additional bias layers in a second direction that is antiparallel to said first direction, thereby partly canceling said longitudinal bias with no accompanying weakening of the free layer at the free layer edge.

18. The method of claim 17 wherein said additional bias layer is selected from the group consisting of CoPt, CoCrPt, CoNiCr, NiFe/IrMn, and CoFe/IrMn whereby it has good exchange coupling field with antiferromagnetic layers, giving it an effective coercivity that is between about 0.05 and 0.75 times that of said permanent magnet layer.

19. The method of claim 17 wherein said additional bias layer is deposited to a thickness that is at most 0.02 microns less than that of said permanent magnet layer.

20. The method of claim 17 wherein said first gap is between about 0.1 and 0.2 microns and said second gap is between about 0.08 and 0.2 microns.

21. The method of claim 17 wherein said distance above said permanent magnet layer of the opposing additional bias layer is between about 50 and 300 Angstroms.

22. The method of claim 17 wherein said magnetic read head is a CIP GMR head.

23. The method of claim 17 wherein said magnetic read head is a CPP GMR head.

24. The method of claim 17 wherein said magnetic read head is a TMR head.

25. A method to enhance stability of a free layer, while retaining free layer signal strength, in a magnetic read head, comprising:
    providing a pair of opposing permanent magnet layers, separated by a first gap and magnetized in a first direction, that abut, and do not overlap in any way, including through direct connection to another magnetic material, said free layer, thereby providing longitudinal bias thereto;
    inserting, below said permanent magnet layers, a pair of opposing additional bias layers that are separated by a second gap that is less than said first gap; and
    then magnetizing said additional bias layer in a second direction that is antiparallel to said first direction, thereby partly canceling said longitudinal bias with no accompanying weakening of the free layer at the free layer edge.

26. The method of claim 25 wherein said magnetic read head is a CIP GMR head.

27. The method of claim 25 wherein said magnetic read head is a CPP GMR head.

28. The method of claim 25 wherein said magnetic read head is a TMR head.

29. The method of claim 25 wherein said additional bias layer is selected from the group consisting of CoPt, CoCrPt, CoNiCr, NiFe/IrMn, and CoFe/IrMn whereby it has good exchange coupling field with antiferromagnetic layers, giving it an effective coercivity that is between about 0.05 and 0.75 times that of said permanent magnet layer.

30. The method of claim 25 wherein said additional bias layer is deposited to a thickness that is at most 0.02 microns less than that of said permanent magnet layer.

31. The method of claim 25 wherein said first gap is between about 0.1 and 0.2 microns and said second gap is between about 0.08 and 0.2 microns.

32. The method of claim 25 wherein said distance below said permanent magnet layer of the opposing additional bias layer is between about 50 and 300 Angstroms.

* * * * *